United States Patent [19]
Beaulier et al.

[11] Patent Number: 6,158,785
[45] Date of Patent: Dec. 12, 2000

[54] MULTI-START WEDGE THREAD FOR TUBULAR CONNECTION

[75] Inventors: Bernard F. Beaulier, Humble; David L. Mallis, The Woodlands, both of Tex.

[73] Assignee: Hydril Company

[21] Appl. No.: 09/130,249

[22] Filed: Aug. 6, 1998

[51] Int. Cl.[7] ...................................................... F16L 15/00
[52] U.S. Cl. .............................. 285/334; 285/390; 29/456
[58] Field of Search ..................... 285/332, 333, 285/334, 355, 390; 29/456

[56] References Cited

U.S. PATENT DOCUMENTS

| | | | |
|---|---|---|---|
| 2,239,942 | 4/1941 | Stone et al. . | |
| 2,992,028 | 7/1961 | Knox . | |
| 3,359,013 | 12/1967 | Knox et al. . | |
| 3,989,284 | 11/1976 | Blose . | |
| 4,564,225 | 1/1986 | Taylor | 285/355 X |
| 4,582,348 | 4/1986 | Dearden et al. | 285/334 X |
| 4,707,001 | 11/1987 | Johnson | 285/334 X |
| 4,735,444 | 4/1988 | Skipper | 285/355 X |
| 4,917,409 | 4/1990 | Reeves | 285/334 |
| 5,360,240 | 11/1994 | Mott | 285/334 X |
| 5,415,442 | 5/1995 | Klementich | 285/334 X |

Primary Examiner—Lynne H. Browne
Assistant Examiner—Greg Binda
Attorney, Agent, or Firm—Rosenthal & Osha L.L.P.

[57] ABSTRACT

A threaded pipe connection includes a box member and a pin member. The box member has multiple internal, generally dovetail-shaped threads, each with stab flanks, load flanks, roots, and crests. The pin member also has multiple external, generally dovetail-shaped threads, each with stab flanks, load flanks, roots, and crests. The internal threads of the box member each increase in width in one direction, while the external threads of the pin member increase in width in the other direction so that the complementary flanks of the respective threads move into engagement upon make-up of the connection.

35 Claims, 14 Drawing Sheets

MULTI-START WEDGE THREAD FOR TUBULAR CONNECTION

FIELD OF THE INVENTION

The invention relates to threaded tubular joints usable in oil and gas well drilling and production, such as tubing, casing, line pipe, and drill pipe, commonly known collectively as oilfield tubular goods. More particularly, the invention relates to a tubular joint for connecting male (pin) and female (box) members.

BACKGROUND OF THE INVENTION

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

Current technology exists that combines a conical metal-to-metal seal with a wedge thread as the torque stop. The difficulty in working with this design concept is that the linear variance of the wedge torque stop, due to the wedge thread geometry and process capabilities, requires a very shallow angle for the metal-to-metal seal. In order to generate enough radial interference in the metal-to-metal seal to effect an efficient sealing mechanism, a great deal of rotation is required from the time the shallow angle seals of the pin and box members make initial contact to the point of final make up. The longer metal-to-metal seals are in contact during rotation, the higher the tendency for galling. If interference is decreased to lessen the amount of rotational contact, sufficient contact forces may not exist to effect a reliable seal at final make up. This results in a critical balancing act that affords little leeway along the sealing ability versus galling resistance continuum.

As shown in FIG. 1, a prior art connection 10 includes a pin member 11 and a box member 12. Box member 12 has a tapered, internal, generally dovetail-shaped thread structure 14 formed thereon and adapted for engaging complementary tapered, external, generally dovetail-shaped thread structure 15 formed on pin member 11 to mechanically secure the box and pin members in a releasable manner.

Internal thread 14 of box member 12 has stab flanks 18, load flanks 16, roots 20, and crests 24. The thread increases in width progressively at a uniform rate in one direction substantially the entire helical length of thread 14. External thread 15 of pin member 11 has stab flanks 19, load flanks 17, roots 21, and crests 25. The thread increases in width progressively at a uniform rate in the other direction substantially the entire helical length of thread 15. The oppositely increasing thread widths and the taper of threads 14 and 15, cause the complementary roots and crests of the respective threads to move into engagement during make-up of the connection. Root and crest engagement is followed by the moving of complementary stab and load flanks into engagement upon make-up of the connection. The moving of complementary flanks, roots and crests into engagement forms sealing surfaces that resist the flow of fluids between the threads The pin member 11 or the box member 12 defines the longitudinal axis 13 of the made-up connection 10. The roots and crests of the box and pin members are flat and parallel to the longitudinal axis of the connection and have sufficient width to prevent any permanent deformation of the threads when the connection is made up.

FIG. 2 shows a profile of the wedge thread on pin member 11. The dimension AA represents the location of the thread start and dimension BB represents the thread depth. The stab flank and load flank leads are denoted CC and DD respectively.

SUMMARY OF THE INVENTION

In general, in one aspect, a threaded pipe connection includes a box member having a plurality of internal, generally dovetail-shaped wedge threads, each with stab flanks, load flanks, roots, and crests and a pin member having a plurality of external, generally dovetail-shaped wedge threads, each with stab flanks, load flanks, roots, and crests. The internal wedge threads of the box member increase in width in one direction while the external wedge threads of the pin member increase in width in the other direction so that the complementary flanks of the internal and external wedge threads move into engagement upon make-up of the connection.

In accordance with one or more embodiments of the invention, the box member may have two tapered, internal, generally dovetail-shaped wedge threads having a thread start and the pin member may have two tapered, external, generally dovetail-shaped wedge threads having a thread start. The two thread starts of the threads on the box member may be 180 degrees opposed and the two thread starts of the threads on the pin member may be 180 degrees opposed. The box member may have a first thread and a second thread and the pin member may have a first thread and a second thread. Upon make-up a seal may be formed as the load and stab flanks of the first external wedge thread on the pin member come into contact with the mating load flanks of the first internal wedge thread and the mating stab flanks of the second internal wedge thread on the box member in conjunction with the stab and load flanks of the second external wedge thread on the pin member coming into contact with the mating load flanks of the second internal wedge thread and the mating stab flanks of the first internal wedge thread on the box member. Each individual wedge thread may possess a thread depth, taper, stab flank lead, and load flank lead that are identical to each other. The internal and external wedge threads may be tapered so that the complementary roots and crests move into engagement during make-up of the connection in conjunction with the flanks moving into engagement upon make-up of the connection and form sealing surfaces that resist the flow of fluids between the threads. The internal wedge threads of the box member and the external wedge threads of the pin member may be tapered so that complementary roots and crests maintain controlled clearance upon make-up of the connection and in conjunction with a thread compound form sealing surfaces that resist the flow of fluids between the threads.

Each individual wedge thread may possess a taper, stab flank lead, and load flank lead that are greater than that of the corresponding prior art wedge thread form. The roots and crests of the internal and external wedge threads may have sufficient width to prevent any permanent deformation of the threads when the connection is made up. The roots and crests of the box and pin members may be flat and parallel to a longitudinal axis of the connection. The roots of the box and pin members may be flat and parallel to a longitudinal axis of the connection and the crests may be tapered to the longitudinal axis of the connection. The contact between the roots and crests of at least one thread on the box member and complementary roots and crests on the pin member may occur prior to the contact between the stab and load flanks of at least one thread on the box member and complementary stab and load flanks on the pin member. Clearance may exist between the roots and crests of at least one wedge thread on the box member and complementary roots and crests on the pin member when contact occurs between the stab and load flanks of at least one wedge thread on the box member and complementary stab and load flanks on the pin member. The box member may have two non-tapered, internal, generally dovetail-shaped wedge threads and the pin member may have two non-tapered, internal, generally dovetail-shaped wedge threads.

The box member may have at least three internal, generally dovetail-shaped wedge threads having thread starts and the pin member may have an equal number of external, generally dovetail-shaped wedge threads having thread starts. The thread starts of each thread on the box member may be oriented symmetrically apart from one another and the thread starts of each thread on the pin member may be oriented symmetrically apart from one another. Upon make-up, a thread seal may be formed as the load and stab flanks of each external wedge thread on the pin member comes into contact with the mating load flanks of the corresponding internal wedge thread and the mating stab flanks of the adjacent internal wedge thread on the box member.

In general, in one aspect, a method of reducing hoop stress in threaded pipe connection includes providing a box member having a plurality internal, generally dovetail-shaped wedge threads, each with stab flanks, load flanks, roots, and crests and providing a pin member having a plurality of external, generally dovetail-shaped wedge threads, each with stab flanks, load flanks, roots, and crests. Dimensioning the internal threads of the box member to increase in width in one direction while the external threads of the pin member are dimensioned to increase in width in the other direction so that the complementary internal and external flanks of the wedge threads move into engagement upon make-up of the connection.

In accordance with one or more embodiments of the invention, the box member may have two tapered, internal, dovetail-shaped wedge threads and the pin member may have two tapered, external dovetail-shaped wedge threads. The two thread starts of the threads on the box member may be 180 degrees opposed and the two thread starts of the threads on the pin member may be 180 degrees opposed. The box member may have a first thread and a second thread and the pin member may have a first thread and a second thread. The method may include forming a seal upon make-up as the load and stab flanks of the first external wedge thread on the pin member come into contact with the mating load flanks of the first internal wedge thread and the mating stab flanks of the second internal wedge thread on the box member in conjunction with the stab and load flanks of the second external wedge thread on the pin member coming into contact with the mating load flanks of the second internal wedge thread and the mating stab flanks of the first internal wedge thread on the box member. The method may include dimensioning each individual wedge thread to possess a thread depth, taper, stab flank lead, and load flank lead that are identical to each other. The method may include tapering internal and external wedge threads so that the complementary roots and crests move into engagement during make-up of the connection in conjunction with the flanks moving into engagement upon make-up of the connection and form sealing surfaces that resist the flow of fluids between the threads. The method also may include tapering internal wedge threads of the box member and the external wedge threads of the pin member so that complementary roots and crests maintain controlled clearance upon make-up of the connection and in conjunction with a thread compound form sealing surfaces that resist the flow of fluids between the threads. The method may include dimensioning each individual wedge thread to possess a taper, stab flank lead, and load flank lead larger than that of corresponding prior art wedge thread forms. The method may also include dimensioning the roots and crests of the two wedge threads of the box and pin members to have sufficient width to prevent any permanent deformation of the threads when the connection is made up. The method may also include providing the roots and crests of the two wedge threads of the box and pin members flat and parallel to a longitudinal axis of the connection. Further, the method may include dimensioning the roots and crests on at least one wedge thread on the box member to contact complementary roots and crests on the pin member during make-up prior to contact between the stab and load flanks of at least one thread on the pin member with the complementary stab and load flanks on the box member and the complementary load flank on the other thread of the box member. The method may include dimensioning the roots and crests of at least one wedge thread on the pin member and complementary roots and crests on the box member to remain in clearance when contact occurs between the stab and load flanks of at least one wedge thread on the pin member and complementary stab and load flanks on the box member. The box member may have two non-tapered, internal, generally dovetail-shaped wedge threads and the pin member may have two non-tapered, internal, generally dovetail-shaped wedge threads.

The method may include providing a box member having at least three tapered, internal, generally dovetail-shaped wedge threads and a pin member having an equal number of tapered, external, generally dovetail-shaped wedge threads. Further, the method may include orienting the threads of each thread on the box member symmetrically apart from one another and orienting the threads on the pin member symmetrically apart from one another. Also, the method may include forming a thread seal as the load and stab flanks of each external wedge thread on the pin member comes into contact with the mating load flanks of the corresponding internal wedge thread and the mating stab flanks of the adjacent internal wedge thread on the box member.

Advantages may include one or more of the following. By using a multi-start wedge thread design, the structural advantages of the prior art wedge thread over other existing thread designs can be maintained in the present invention while the duration of metal-to-metal contact required from the point that the metal seal initially engage during make-up to the final make-up position is reduced thereby enhancing the galling resistance of the design. Further, the amount of radial interference in the metal seals can be increased at the same time the duration of seal rotational contact is reduced, thus enhancing both the sealing characteristics and galling resistance of the design. Other advantages and features will become apparent from the following description including the drawings and claims.

DETAILED DESCRIPTION

Figure 1:
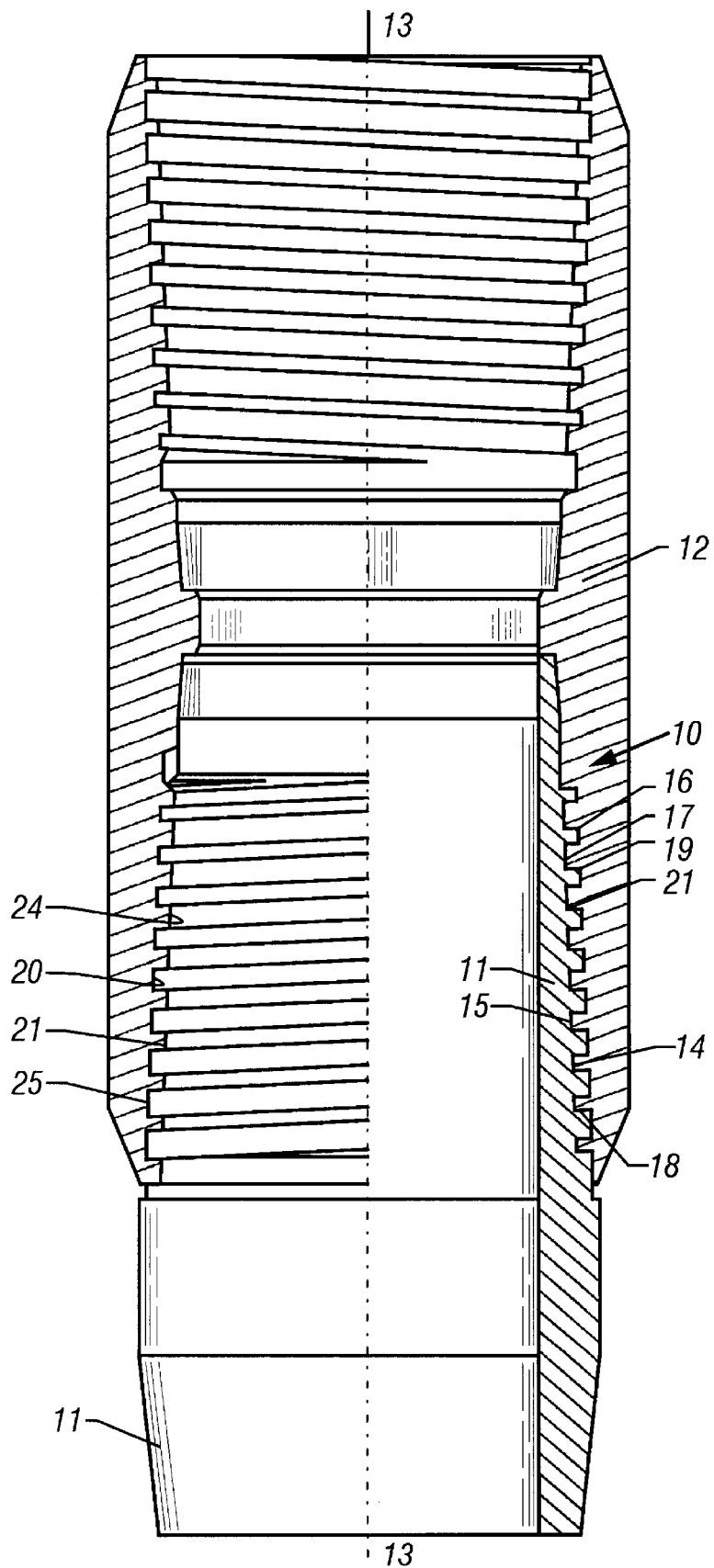
FIG. 1 is a side view, partially in section, of a prior art tubular joint.

Referring to the drawings wherein like reference characters are used for like parts throughout the several views, FIGS. 3–7 illustrate a cross section of the wedge thread of pin member 30, in accordance with embodiments of the invention.

Figure 3:
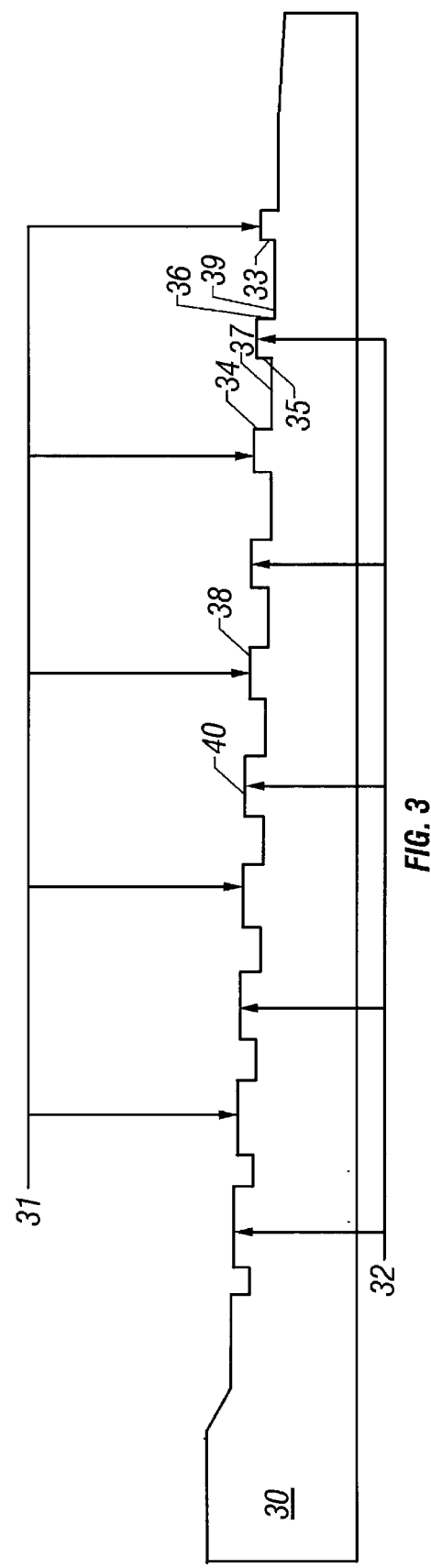
FIG. 3 is a side view of an embodiment of the invention showing the stab flank, load flank, and thread orientation of the two threads.

Referring to FIG. 3, in one embodiment, pin member 30 has a first external thread 31 and a second external thread 32 formed, as described below, in a two-start orientation with, for example, first thread 31 starting 180 degrees opposed to second thread 32. First thread 31 has load flanks 33, stab flanks 34, roots 37 and crests 38. Second thread 32 has load flanks 35, stab flanks 36, roots 39 and crests 40. It should be noted that thread roots 37 and 39 are actually shared by both threads. The threads are cut such that one thread is between the turns of the other thread. Thus, each thread has independent thread crests, load flanks and stab flanks, however, the thread root is shared. Both threads increase in width progressively at a uniform rate in one direction over substantially their entire helical lengths. Internal threads of a box member (not shown) are similarly formed in a two-start configuration as described below. The internal threads of the box member increase in width progressively at a uniform rate in the other direction over substantially their entire helical length. The oppositely increasing thread widths of the internal threads of the box member and external threads of the pin member cause the complementary roots, and crests of the respective threads to move into engagement during make-up of the connection in conjunction with moving of complementary stab and load flanks into engagement upon make-up of the connection.

Roots and crests of both threads of the box member are dimensioned to eliminate radial clearance with complementary crests and roots of the pin member. In other words, thread roots 37, 39 and thread crests 38, 40 of pin member 30 come into interference contact with the corresponding thread surfaces of the box member (not shown).

Figure 4:
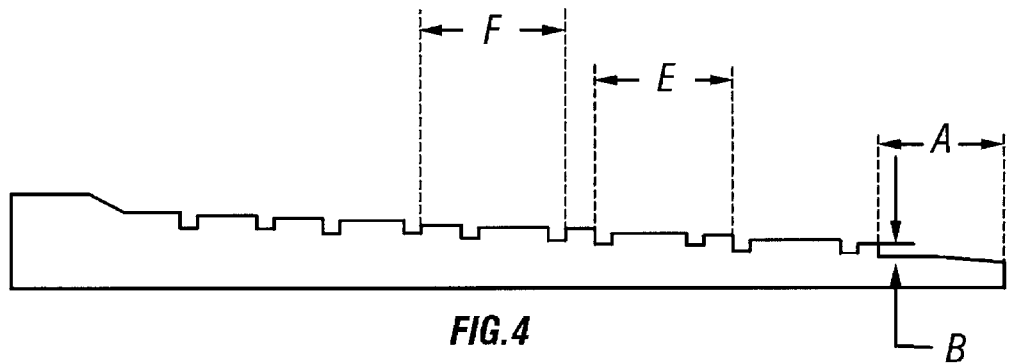
FIG. 4 is a side view of the first thread structure in accordance with an embodiment of the invention.

Referring to FIG. 4, the first wedge thread in accordance with an embodiment of the invention has a taper, stab flank lead E and load flank lead F twice that of the prior art taper, stab flank lead CC and load flank lead DD. In other words, E is equal to 2*CC, F is equal 2*DD and the taper of the invention is equal to twice the prior art taper. By maintaining the thread width while doubling the stab flank lead and the load flank lead dimensions, room is provided on the connector for a second thread of similar geometry to be cut between the first thread. Doubling the thread leads also produces a thread that can be made up twice as fast. Doubling the taper along with the leads allows a thread slope identical to that of the prior art to be maintained in the new configuration. The thread start location A and thread depth B retain the same value as prior art thread start location AA and thread depth BB.

Figure 5:
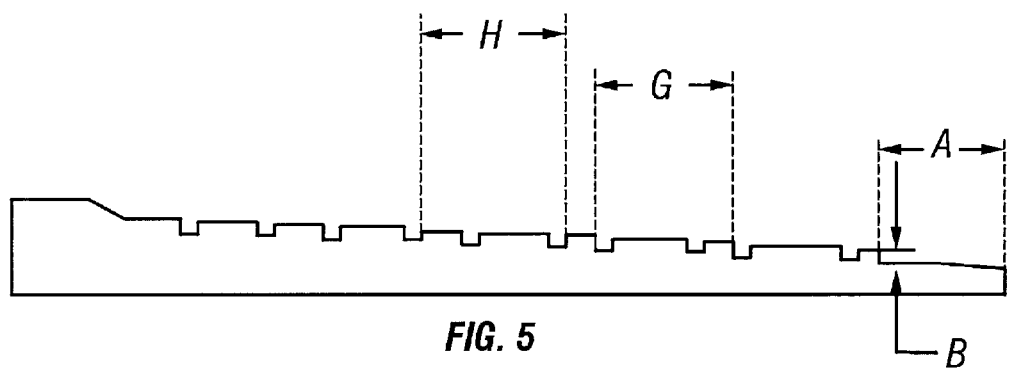
FIG. 5 is a side view of the second thread structure shown 180 degrees out of phase with the first thread structure in accordance with an embodiment of the invention.
Figure 6:
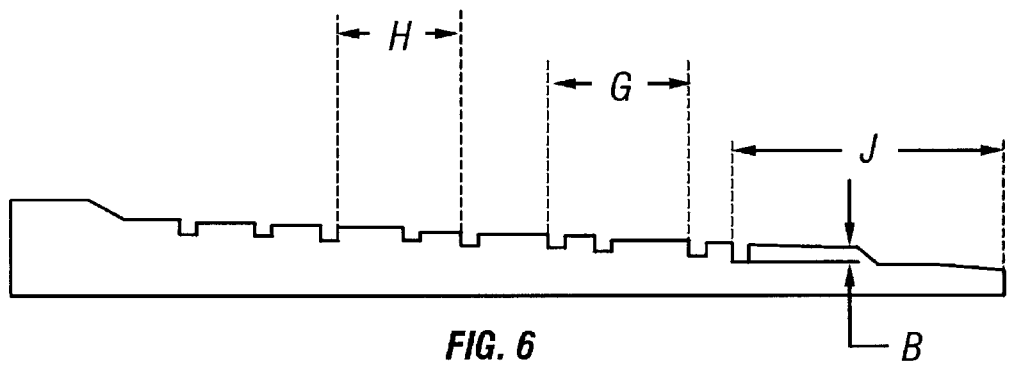
FIG. 6 is a side view of the second thread structure shown in phase with the first thread structure in accordance with an embodiment of the invention.

In FIG. 5, the second wedge thread configuration is depicted 180 degrees out of phase with the first wedge thread shown in of FIG. 4. This similar wedge thread also has a taper, stab flank G and load flank H twice that of the prior art taper, stab flank CC and load flank DD. Again, this means that G is equal to 2*CC, H is equal 2*DD and the taper of the invention is equal to twice the prior art taper. The thread start location A and thread depth B are also maintained on this thread. These similar wedge threads each represent a thread of the final two-start configuration. Referring to FIG. 6, the two threads can be placed in phase by orienting the second thread of FIG. 5 into the same plane as the first thread of FIG. 4. This results in a thread location J which is half of the stab flank lead G further along the member from its thread start location A. In other words, J is equal to A+(G/2).

Figure 7:
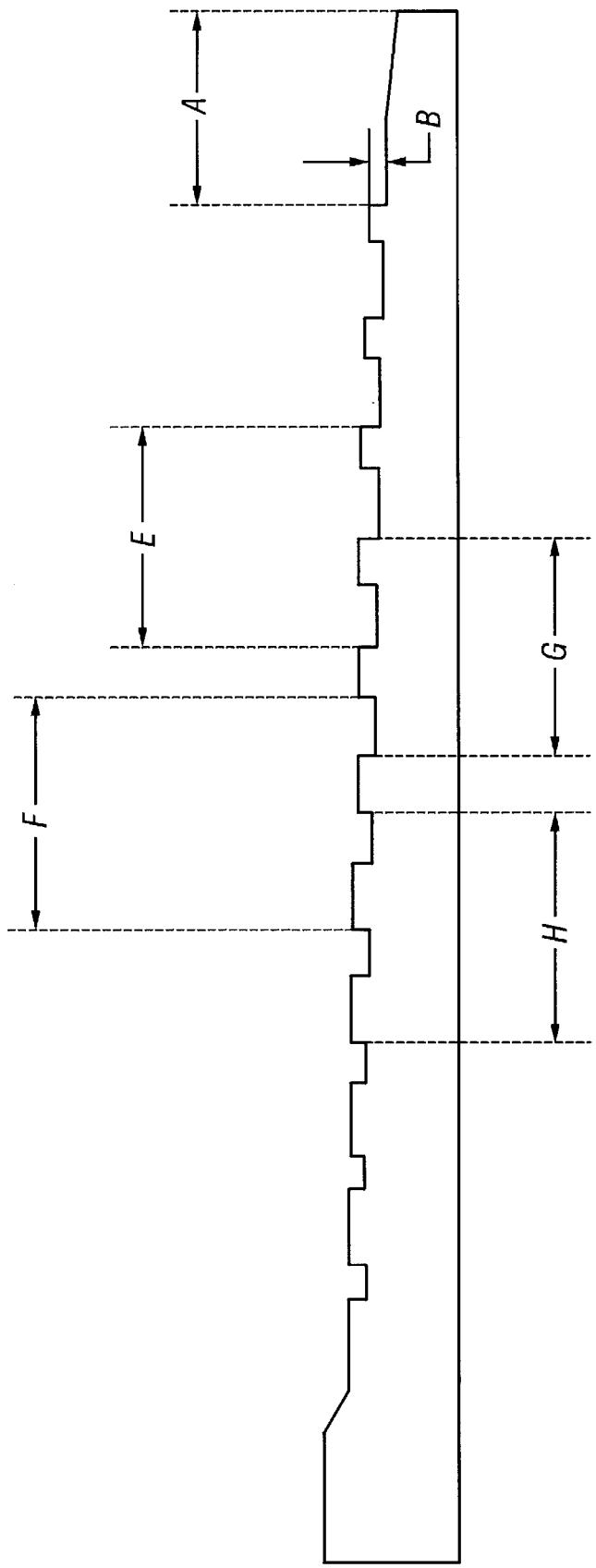
FIG. 7 is a side view of an embodiment of the invention showing the two thread structures and identifying the thread start, thread depth, stab flank lead, and load flank lead relationships of one of the thread structures.
Figure 8:
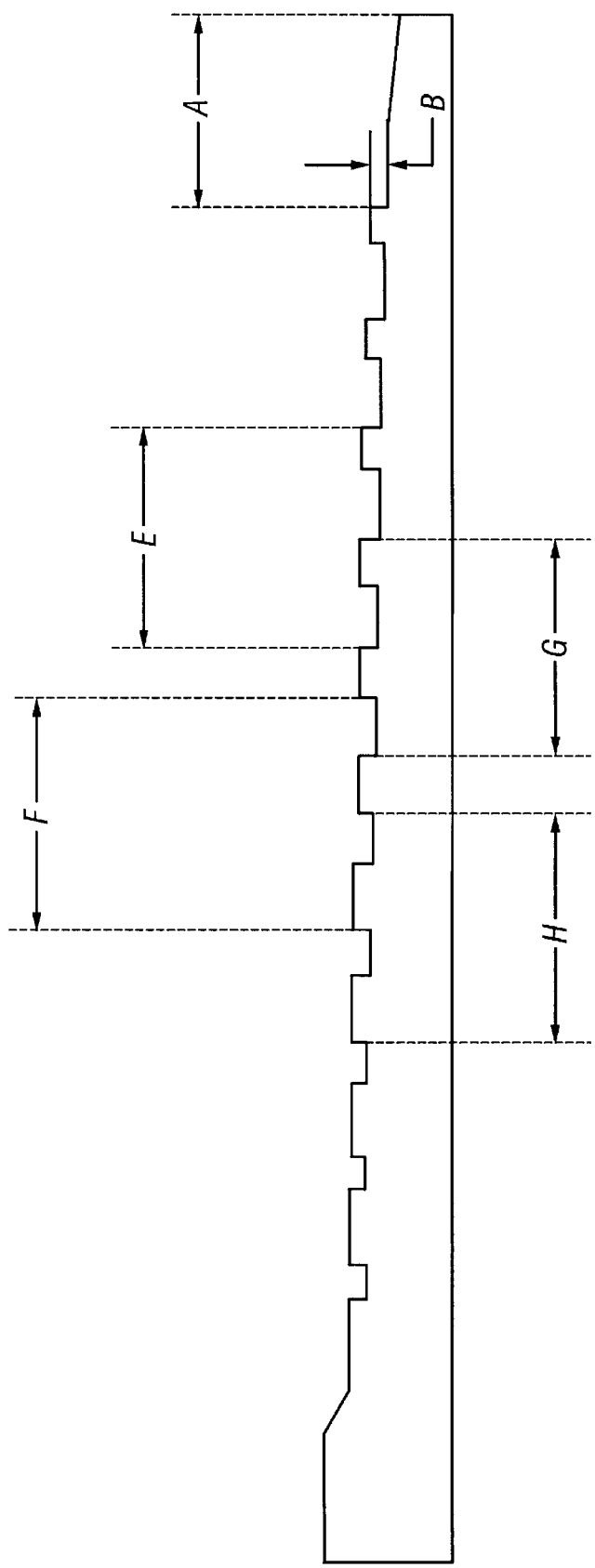
FIG. 8 is a side view of an embodiment of the invention showing the two thread structures and identifying the thread start, thread depth, stab flank lead, and load flank lead relationships of one of the thread structures.

Referring to FIG. 7, if FIG. 4 is overlaid onto FIG. 6 and the excess material at the thread roots is removed, a two-start wedge thread is created in accordance with an embodiment of the invention. The taper, stab flank lead E, G and load flank lead F, H for each thread are twice that of the prior art taper, stab flank lead CC and load flank lead DD. The thread start location A and thread depth B for each thread remain unchanged although 180 degrees out of phase to each other. With double taper and double leads on both threads a thread geometry is produced that yields distinctly new advantages while retaining the advantages inherent to a wedge thread design. Those skilled in the art will understand that doubling the taper and thread leads is a design choice and may be modified to produce a taper, stab flank lead and load flank lead greater by any dimension, both integer multiples, e.g., 3 or 4 times that of the prior art, and non-integer multiples, e.g., 0.75 or 1.5 times that of the prior art. Also, the roots and crests may be totally or partially tapered. For example, a taper may exist along the entire length of the thread crest or may only exist on a portion of the thread while the root of the thread is not tapered. FIG. 8 shows these characteristics applied to a non-tapered thread. Except for the taper, the thread shown in FIG. 8 is identical to the thread shown in FIG. 7.

Figure 2:
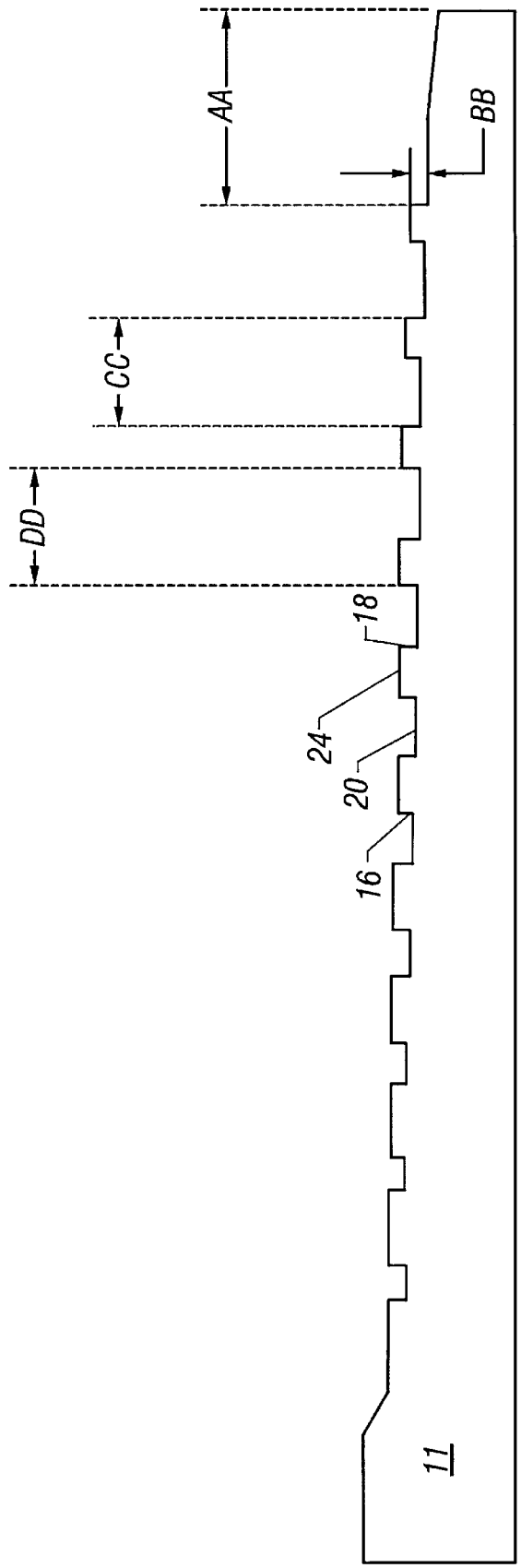
FIG. 2 is a side view of a prior art thread structure.

As can be seen in FIG. 2, a conventional thread seal is created by contact of the thread crest 24 of pin member 11 with the mating thread root of box member 12 and the thread root of the pin 20 with the mating thread crest of the box during make-up of the connection, in conjunction with the stab flank 18 and load flank 16 of the pin member contacting the mating flanks of the box member upon make-up of the connection.

Figure 9:
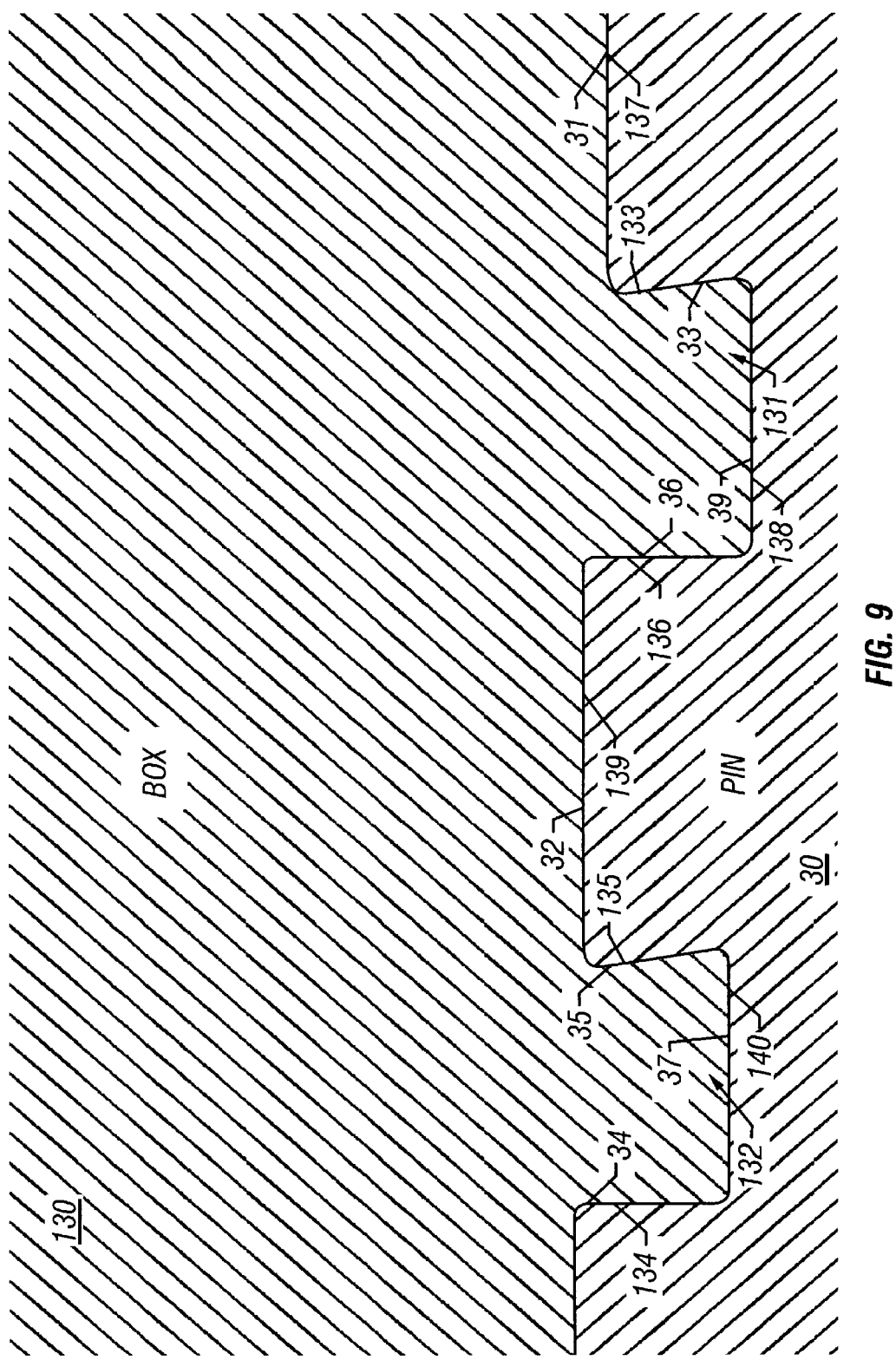
FIG. 9 is an enlarged view of an embodiment of the invention showing interference existing on both threads.

Referring to FIG. 9, an enlarged view of pin member 30 is shown made-up with a box member 130. Box member 130 has a first thread 131 and a second thread 132 as described above. Each thread of box member 130 has load flanks 133, 135, stab flanks 134, 136, roots 137, 139, and crests 138, 140, stab flanks 133, 135 similar to pin member 30 where the numbers of the like parts are increased by 100.

A thread seal is created in accordance with this embodiment of the invention by contact of the thread crests with complementary thread roots during make-up and contact of the stab and load flanks with complementary stab and load flanks upon make-up. More particularly, thread crests 31 of the first thread of pin member 30 contact the mating thread roots shared by both threads of box member 130 and thread crests 131 of the first thread of box member 130 contact the mating roots 37, 39 shared by both threads of pin member 30. The load flanks 33 of the first thread of pin member 30 contact mating load flanks 133 of the first thread of box member 130 and the stab flanks 34 of the first thread of pin member 30 contact the mating stab flanks 134 of the second thread of box member 130. This occurs in tandem with contact of the thread crests 32 of the second thread of pin member 30 with the mating thread roots 137, 139 shared by both threads of box member 130 and contact of thread crests 132 of the second thread in box member 130 with the mating thread roots 37, 39 shared by both threads of pin member 30. Also, load flanks 35 of the second thread of pin member 30 and stab flanks 34 of the first thread of pin member 30 contact the mating load flanks 135 on the second thread and stab flanks 134 on the first thread of box member 130 respectively.

The prior art thread seal formed by contact as described above is adequate for applications where liquid will pass through the pipe. However, in applications where a gas passes through the pipe, an additional metal-to-metal seal is also needed. The metal-to-metal seal is formed by contact of the nose of the pin member and bore of the box member. Forming this metal-to-metal seal is important to sealability, but since metal is contacting metal, galling may occur. It can be seen by comparing FIG. 7 to FIG. 2 that the thread leads E, F, G and H will advance twice as fast per revolution during make-up as the thread leads CC and DD. This rapid advancement reduces the duration of metal-to-metal contact between the metal-to-metal seal during make-up which increases galling resistance. In addition to reducing the duration of metal-to-metal contact, the design allows the amount of metal-to-metal contact to be increased so that sealability is enhanced at the same time that the galling resistance is increased.

Figure 10:
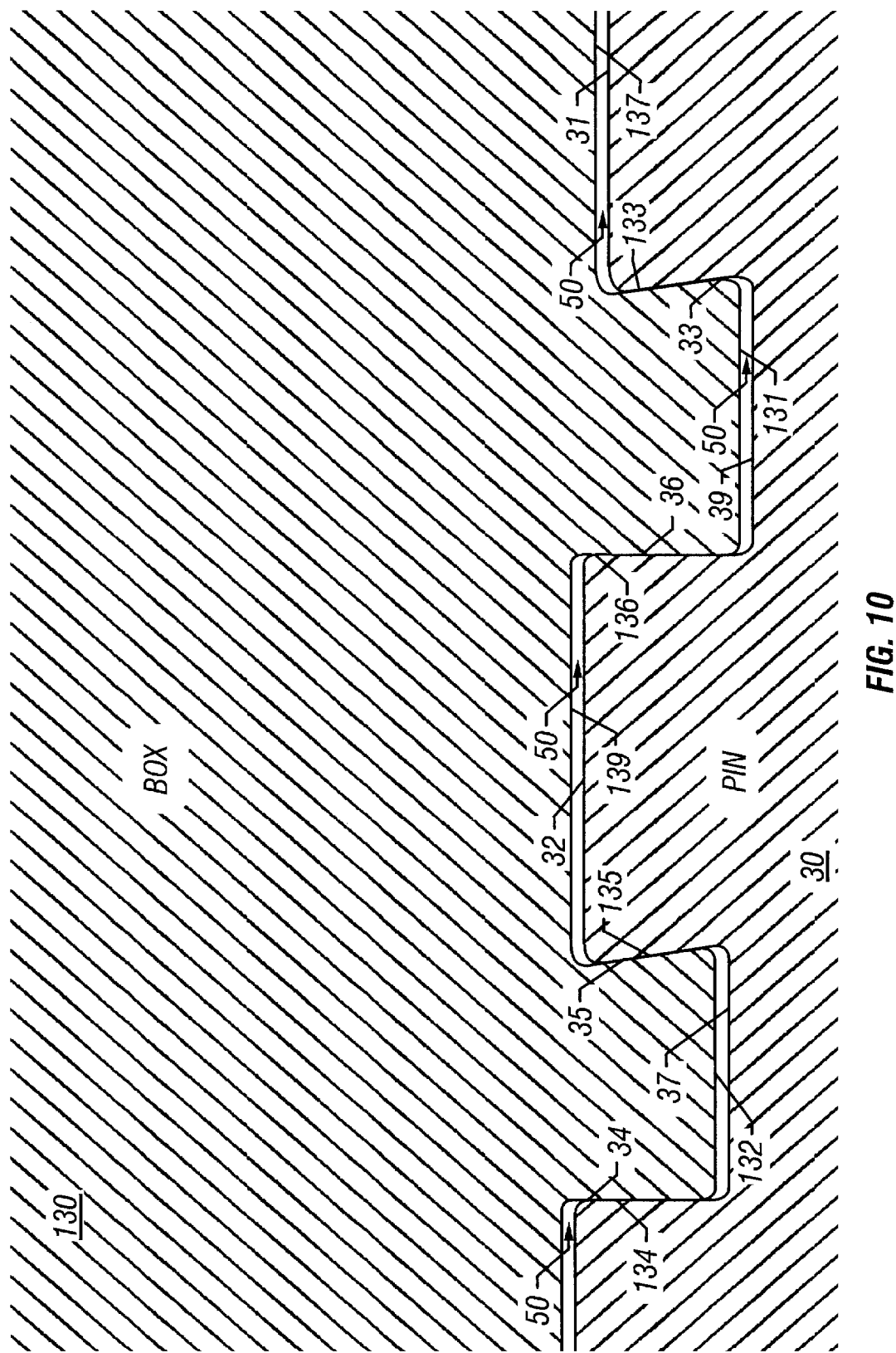
FIG. 10 is an enlarged view of an embodiment of the invention showing clearance existing between the roots and crests of both threads.
Figure 11:
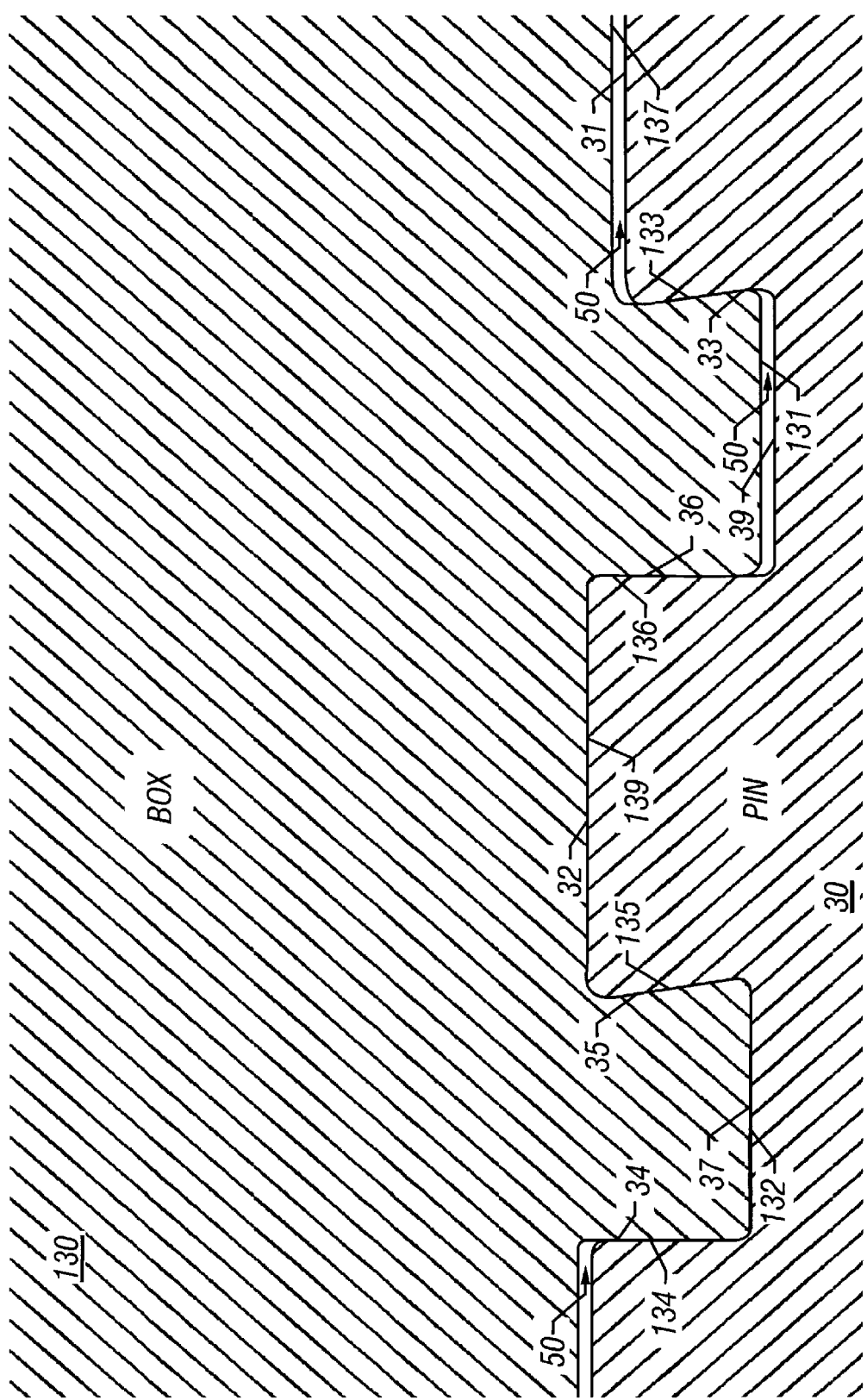
FIG. 11 is an enlarged view of an embodiment of the invention showing clearance existing between the roots and crests of one thread while interference exists on the other.
Figure 12:
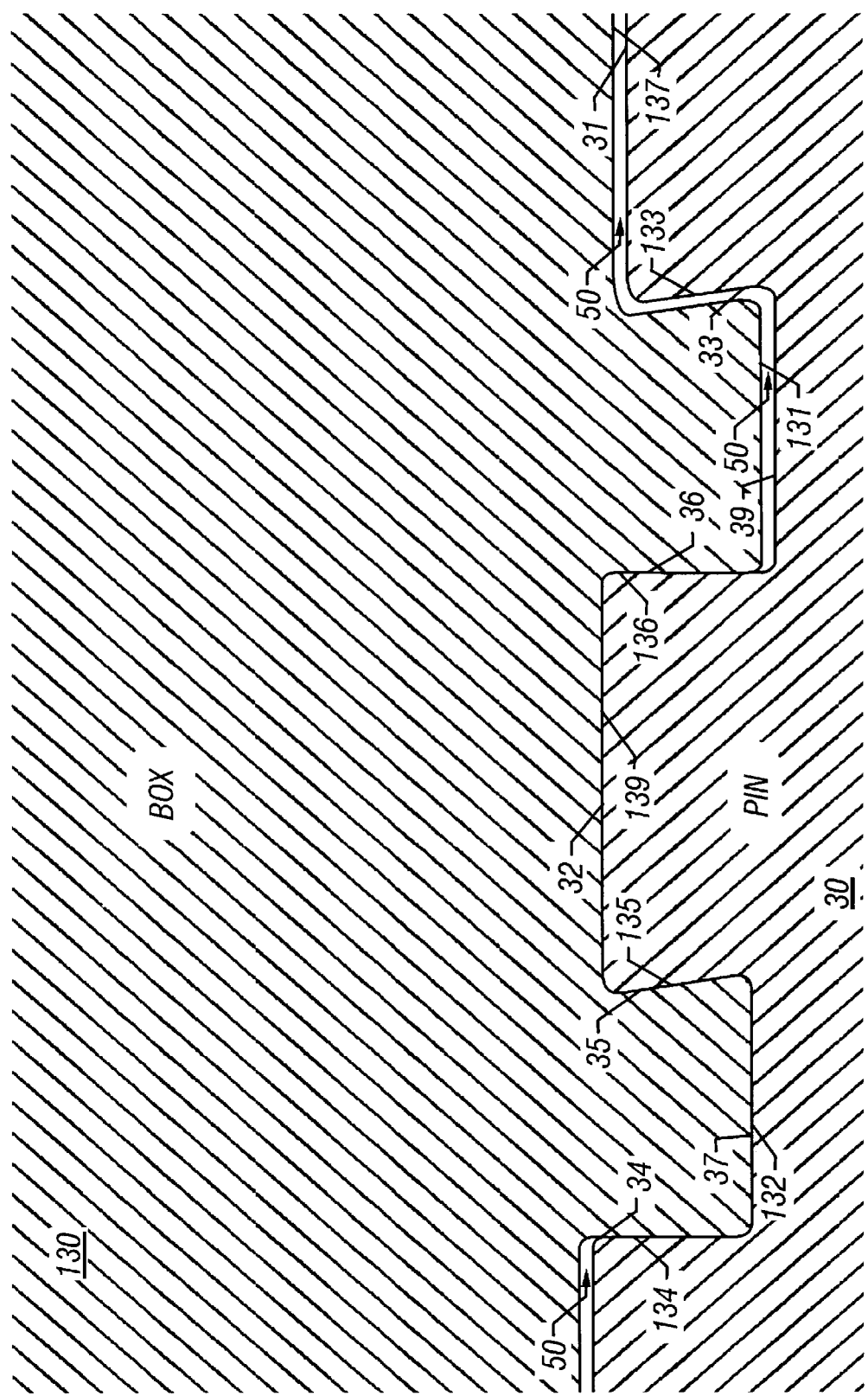
FIG. 12 is an enlarged view of an embodiment of the invention showing clearance existing between the roots and crests and stab flanks of one thread while interference exists on the other.

In this exemplary situation, interference contact occurs between the roots and crests, stab flanks and load flanks of both the threads of the box and pin members. Alternatively, as shown in FIGS. 10–12, there may exist clearance 50 between any of the roots and crests, stab flanks and load flanks of either or both threads upon final make-up. It will be understood to those skilled in the art that if clearance is maintained between roots and crests upon make-up of the connection sealing surfaces that resist the flow of fluids between the threads can be formed in conjunction with thread compound.

Referring to FIGS. 10–12, an enlarged view of pin member 30 is shown made-up with a box member 130 in accordance with an embodiment of the invention. Box member 130 has a first thread 131 and a second thread 132 as described above. Each thread of box member 130 has load flanks 133, 135, stab flanks 134, 136, roots 137, 139, and crests 138, 140, stab flanks 133, 135 similar to pin member 30 where the numbers of the like parts are increased by 100.

A thread seal may be created in accordance with the invention by contact of the thread crests of one thread with complementary thread roots, contact of the load flanks of one thread with complementary load flanks and contact of the stab flanks of one thread with complementary stab flanks. Also, it is understood that the sealing contact could occur indirectly when using thread compound. Clearance may exist between one or more of the roots and crests, the stab flanks and the load flanks of the other thread. In addition, clearance may also exist between the thread roots and crests of the one thread, i.e., clearance exists between the roots and crests of both threads and between one or more of the stab flanks and the load flanks. Further, if more than two threads exist, clearance may exist between any of the roots and crests, stab flanks and load flanks of any number of the threads. Ultimately, a thread seal may be created as long as the stab and load flanks of one thread come into interference contact upon final make-up. For illustration purposes, this is described in detail for certain embodiments below.

Referring to FIG. 11, in one embodiment, thread crests 31 of the first thread of pin member 30 remain in clearance from mating thread roots 137, 139 shared by both threads of box member 130 and thread crests 131 of the first thread of box member 130 remain in clearance from mating roots 37, 39 shared by both threads of pin member 30. Load flanks 33 of the first thread of pin member 30 contact mating load flanks 133 of box member 130 and stab flanks 36 of the second thread of pin member 30 contact mating stab flanks 136 of box member 130. This occurs in tandem with contact of thread crests 32 of the second thread of pin member 30 with mating thread roots 137, 139 shared by both threads of box member 130 and contact of thread crests 132 of the second thread in box member 130 with mating thread roots 37, 39 shared by both threads of pin member 30. Also, load flanks 35 of the second thread of pin member 30 and stab flanks 34 of the first thread of pin member 30 contact mating load flanks 135 and stab flanks 134 of box member 130 respectively.

Referring to FIG. 12, in one embodiment, thread crests 31 of the first thread of pin member 30 remain in clearance from mating thread roots 137, 139 shared by both threads of box member 130 and thread crests 131 of the first thread of box member 130 remain in clearance from mating roots 37, 39 shared by both threads of pin member 30. Load flanks 33 of the first thread of pin member 30 remain in clearance from mating load flanks 133 of box member 130 while stab flanks 36 of the second thread of pin member 30 contact mating stab flanks 136 of box member 130. This occurs in tandem with contact of thread crests 32 of the second thread of pin member 30 with mating thread roots 137, 139 shared by both threads of box member 130 and contact of thread crests 132 of the second thread in box member 130 with mating thread roots 37, 39 shared by both threads of pin member 30. Also, load flanks 35 of the second thread of pin member 30 and stab flanks 34 of the first thread of pin member 30 contact mating load flanks 135 and stab flanks 134 of box member 130 respectively.

Figure 13:
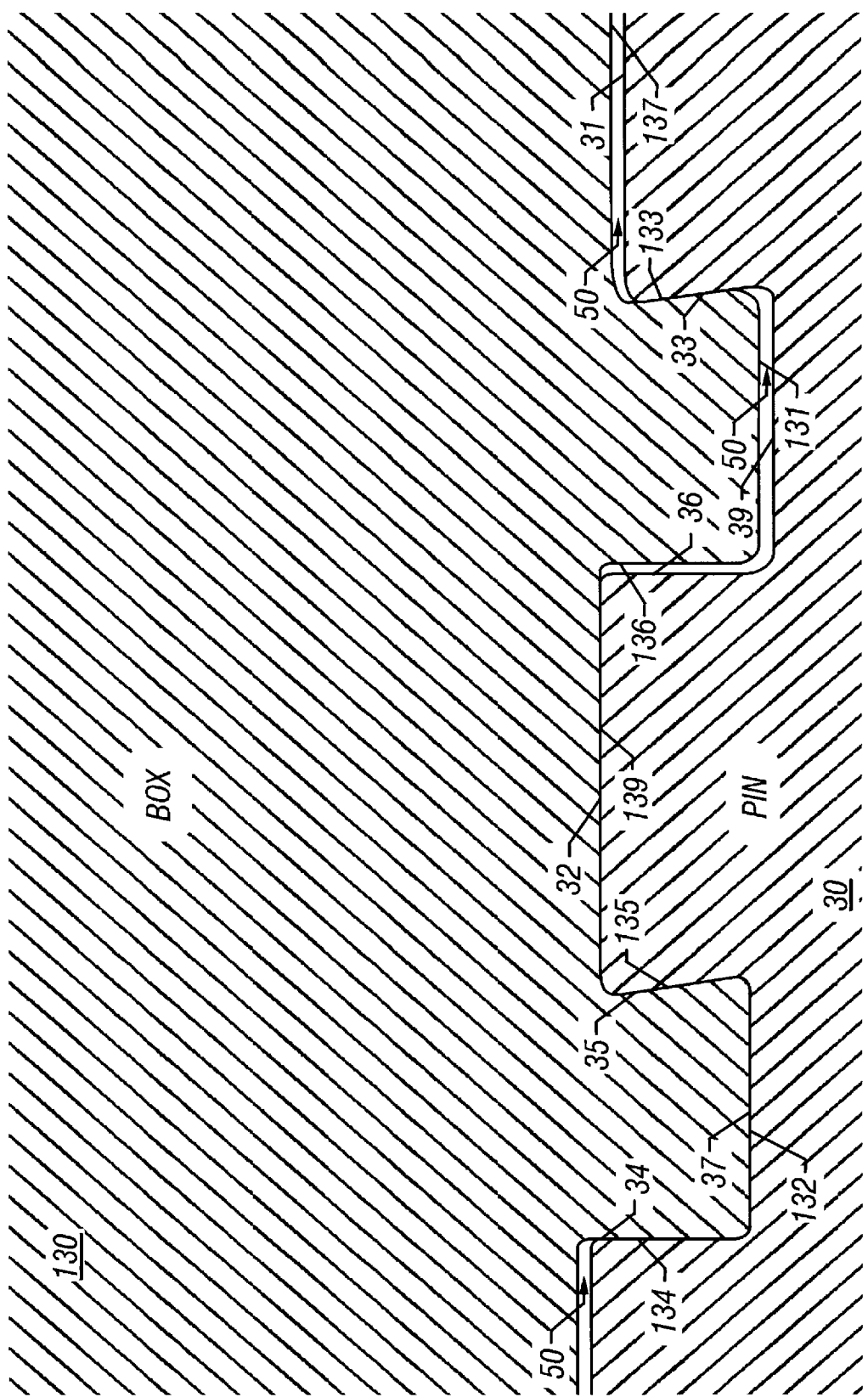
FIG. 13 is an enlarged view of an embodiment of the invention showing clearance existing between the roots and crests and load flanks of one thread while interference exists on the other.

Referring to FIG. 13, in one embodiment, thread crests 31 of the first thread of pin member 30 remain in clearance from mating thread roots 137, 139 shared by both threads of box member 130 and thread crests 131 of the first thread of box member 130 remain in clearance from mating roots 37, 39 shared by both threads of pin member 30. Stab flanks 36 of the second thread of pin member 30 remain in clearance from mating stab flanks 136 of box member 130 while load flanks 33 of the first thread of pin member 30 contact mating load flanks 133 of box member 130. This occurs in tandem with contact of thread crests 32 of the second thread of pin member 30 with mating thread roots 137, 139 shared by both threads of box member 130 and contact of thread crests 132 of the second thread in box member 130 with mating thread roots 37, 39 shared by both threads of pin member 30. Also, load flanks 35 of the second thread of pin member 30 and stab flanks 34 of the first thread of pin member 30 contact mating load flanks 135 and stab flanks 134 of box member 130 respectively.

Figure 14:
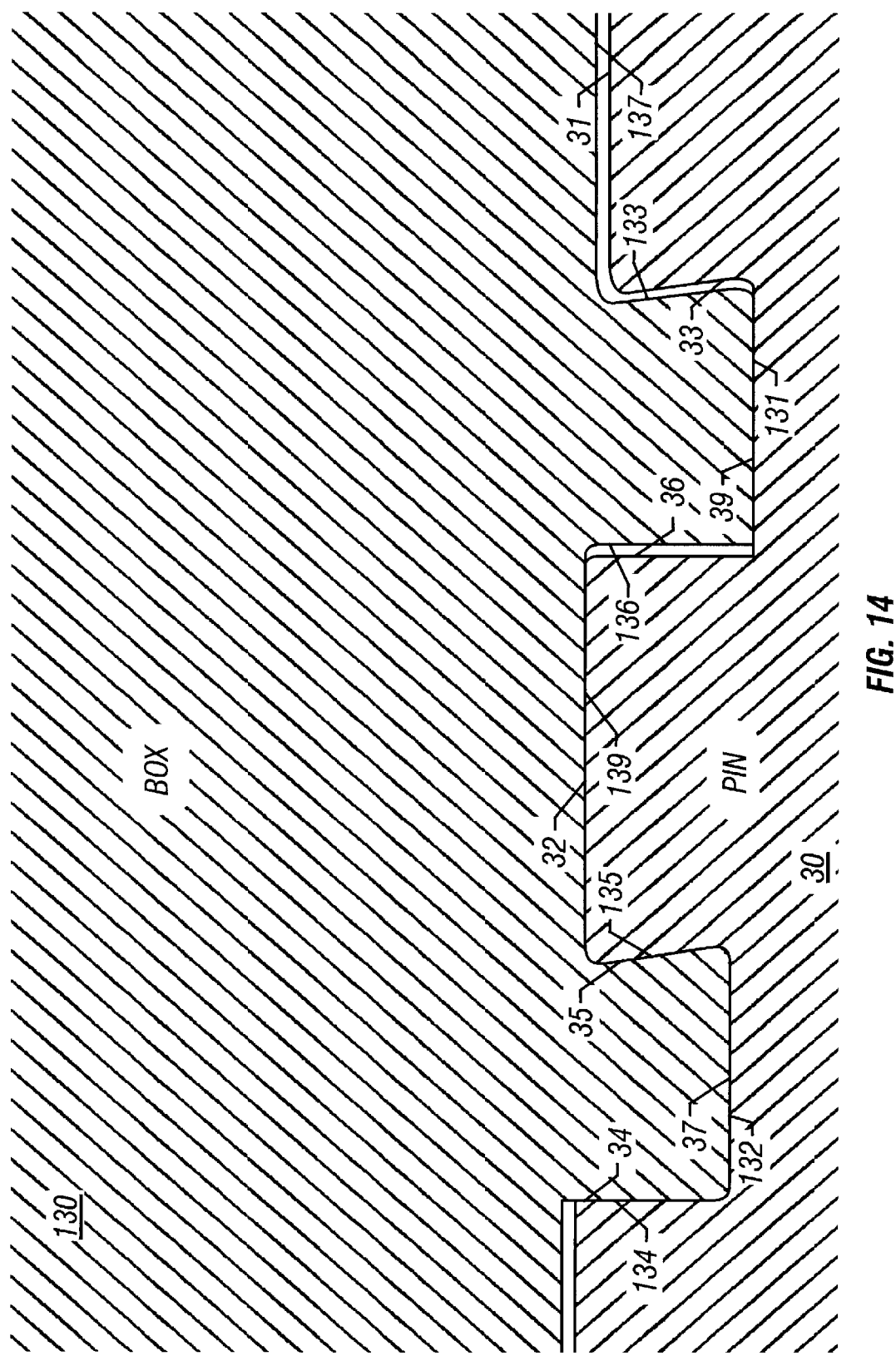
FIG. 14 is an enlarged view of an embodiment of the invention showing clearance existing between the stab flanks and the load flanks of one thread while interference exists on the other.

Referring to FIG. 14, in one embodiment, thread crests 31 of the first thread of pin member 30 contact mating thread roots 137, 139 shared by both threads of box member 130 and thread crests 131 of the first thread of box member 130 contact mating roots 37, 39 shared by both threads of pin member 30. Stab flanks 36 of the second thread of pin member 30 remain in clearance from mating stab flanks 136 of box member 130 and load flanks 33 of the first thread of pin member 30 remain in clearance from mating load flanks 133 of box member 130. This occurs in tandem with contact of thread crests 32 of the second thread of pin member 30 with mating thread roots 137, 139 shared by both threads of box member 130 and contact of thread crests 132 of the second thread in box member 130 with mating thread roots 37, 39 shared by both threads of pin member 30. Also, load flanks 35 of the second thread of pin member 30 and stab flanks 34 of the first thread of pin member 30 contact mating load flanks 135 and stab flanks 134 of box member 130 respectively.

As used herein, and as conventionally understood where tubular joints are being connected in a vertical position such as when making up a pipe string for lowering into a well bore, the term "load flank" designates the side wall surface of a thread that faces away from the outer end of the respective pin or box member on which the thread is formed and supports the weight of the lower tubular member hanging in the well bore. The term "stab flank" designates that side wall surface of the thread that faces toward the outer end of the respective pin or box member and supports the weight of the upper tubular member during the initial make-up of the joint.

Figure 15:
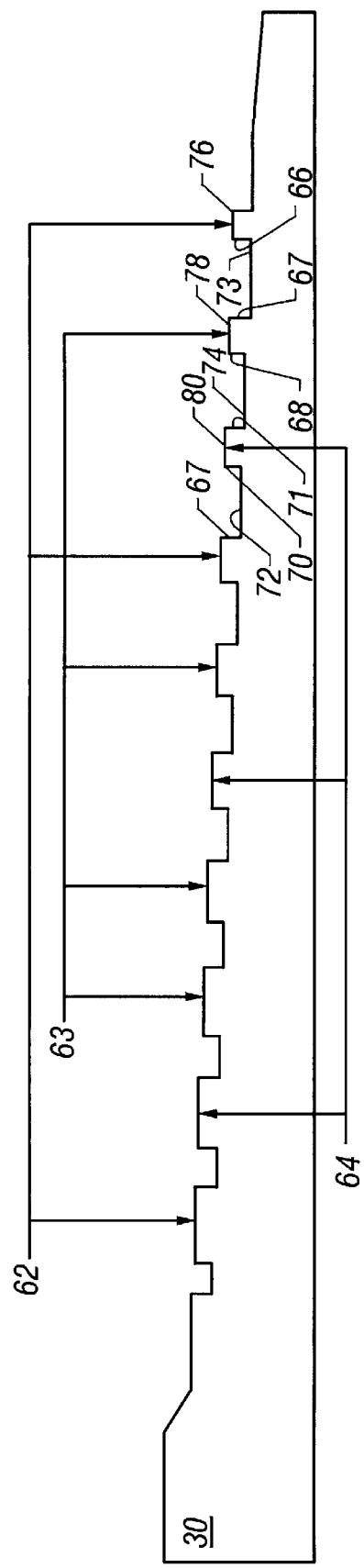
FIG. 15 is a side view of an embodiment of the invention showing the stab flank, load flank, and thread orientation of the three threads.

While in the previous examples a two-start configuration has been described, the present invention could be implemented with any number of threads. For example, referring to FIG. 15, pin member 30 has a first external thread 62, a second external thread 63 and a third external 65 thread formed, as described below, in a three-start orientation with, in one embodiment, first thread 62 starting 120 degrees opposed to second thread 63 and third thread 64. First thread 62 has load flanks 66, stab flanks 67, roots 72 and crests 76, second thread 63 has load flanks 68, stab flanks 69, roots 73 and crests 78 and third thread 64 has load flanks 70, stab flanks 71, roots 74 and crests 80. It should be noted that thread roots 72, 73 and 74 are actually shared by adjacent threads, i.e., the first thread 62 and second thread 63 share thread roots 73, second thread 63 and third thread 64 share thread roots 74, and third thread 64 and first thread 62 share thread roots 72. The threads are cut such that two threads are between the turns of the other thread. Thus, each thread has independent thread crests, load flanks and stab flanks, however, the adjacent threads share a thread root.

All of the threads increase in width progressively at a uniform rate in one direction substantially their entire helical lengths. Internal threads of a box member (not shown) are similarly formed in a three-start configuration as described below. The internal threads of the box member increase in width progressively at a uniform rate in the other direction substantially their entire helical length. The oppositely increasing thread widths of the internal threads of the box member and external threads of the pin member cause the complementary roots and crests of the respective threads to move into engagement during make-up of the connection and the complementary stab and load flanks to move into engagement upon make-up of the connection. A seal is formed as the load and stab flanks of each external wedge thread of the pin member comes into contact with the mating load flanks of the corresponding internal wedge thread and the mating stab flanks of the adjacent wedge thread. For example, the first load flank on the pin member contacts the first load flank of the box member while the first stab flank of the pin member contacts the second stab flank of the box member. Similarly, the second load flank of the pin member contacts the second load flank of the box member while the second stab flank of the pin member contacts the third stab flank of the box member and the third load flank of the pin member contact the third load flank of the box member while the third stab flank of the pin member contacts the first stab flank of the box member.

Figure 16:
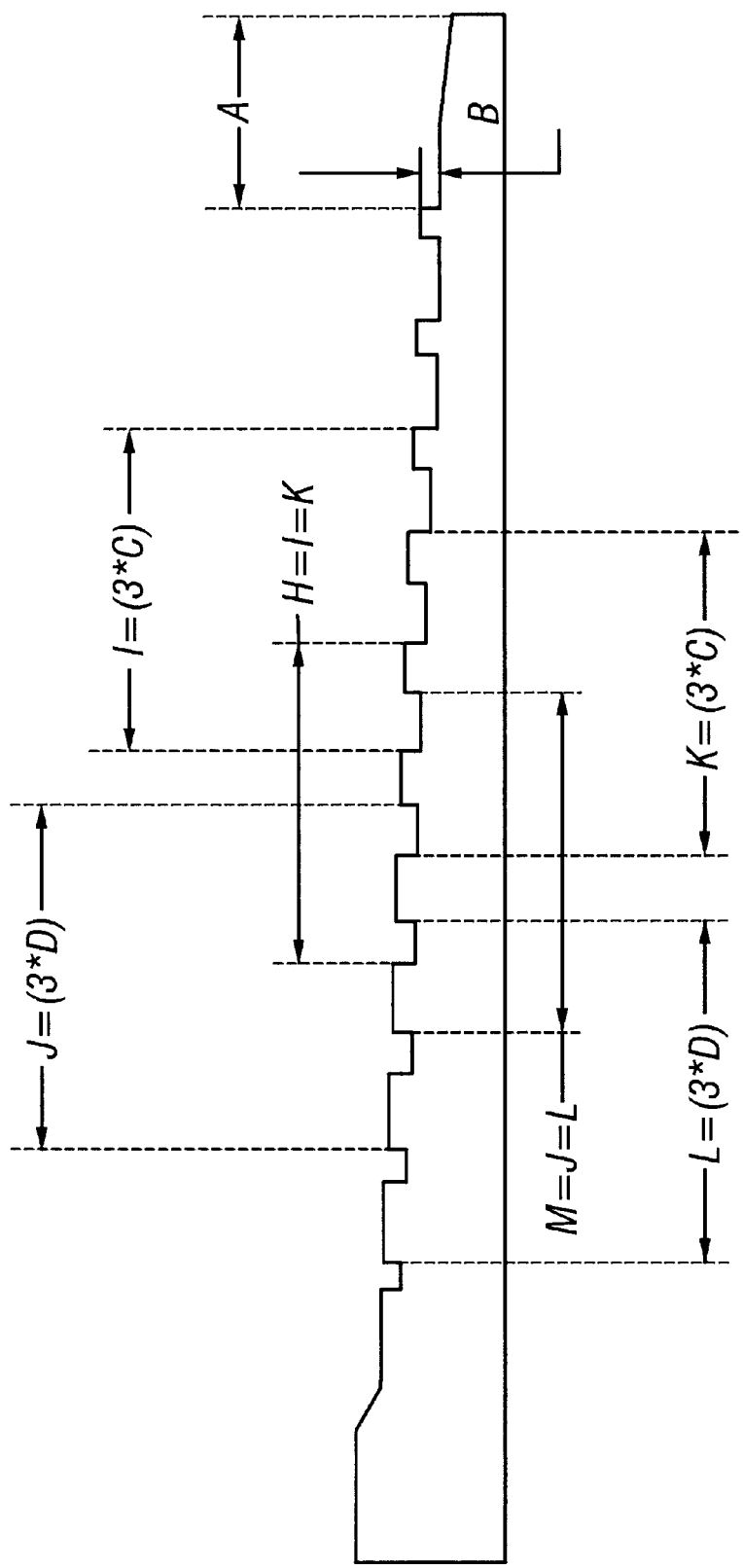
FIG. 16 is a side view of an embodiment of the invention showing the three thread structures and identifying the thread start, thread depth, stab flank lead, and load flank lead relationships of one of the thread structures.

Referring to FIG. 16, a three-start wedge thread in accordance with an embodiment of the invention has a taper, stab flank lead I, K, H and load flank lead J, L, M for each thread are that are three times that of the prior art taper, stab flank lead CC and load flank lead DD. The thread start location A and thread depth B for each thread remain unchanged although 120 degrees out of phase to each other. With triple taper and triple leads on all three threads a thread geometry is produced that yields distinctly new advantages while retaining the advantages inherent to a wedge thread design. The three-start wedge thread makes up three times as fast as the prior art wedge thread and yields advantages similar to those of the two-start wedge design.

Those skilled in the art will appreciate that the present invention is equally applicable to threaded connections wherein clearance exists between complementary roots and crests. It also will be understood that certain features and subcombinations are of utility and may be employed without reference to other features and subcombinations.

Those skilled in the art will appreciate that, in one or more embodiments, the present invention may include generally dove-tail shaped thread forms. Further, those skilled in the art will appreciate that, in one or more embodiments, the present invention may include pin and box members provided with threads that are flat and parallel. This is contemplated by and is within the scope of the claims.

This invention has many advantages over conventional joints. For example, by using a multi-start wedge thread design, the structural advantages of the prior art are maintained in the present invention while the duration of rotational contact of the metal-to-metal seal during make-up can be reduced, thus tremendously enhancing the galling resistance of the design. Further, the amount of radial interference in the seal can be increased at the same time the duration of seal rotational contact is reduced, thus enhancing both the sealing characteristics and galling resistance of the design.

Because many possible embodiments may be made of the invention without departing from the scope thereof, it is to be understood that all matter herein set forth or shown in the accompanying drawings is to be interpreted as illustrative and not in a limiting sense. For example, the addition of a third thread changes the 180 degrees opposition present with two threads, to 120 degrees separation between each of the three threads. This symmetrical separation would change to 90 degrees between each thread for four threads and would change similarly for each additional thread. Also, though shown symmetrically spaced, one skilled in the art understands that the thread start location may be modified to produce thread starts in a configuration other than symmetrical.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A threaded pipe connection comprising:
   a box member having a plurality of internal, generally dovetail-shaped wedge threads, each with stab flanks, load flanks, roots, and crests, the internal wedge threads increasing in width in one direction and arranged to longitudinally overlap; and
   a pin member having a plurality of external, generally dovetail-shaped wedge threads, each with stab flanks, load flanks, roots, and crests, the external wedge threads increasing in width in the other direction and arranged to longitudinally overlap so that complementary flanks of the internal and external wedge threads move into engagement upon make-up of the connection,
   wherein a seal is formed upon make-up as the load and stab flanks of each external wedge thread on the pin member come into contact with mating load and stab flanks of the internal wedge thread of the box member, and
   one of the mating load and stab flanks is of the corresponding internal wedge thread and the other of the mating load and stab flanks is of an adjacent internal wedge thread on the box member.

2. The connection of claim 1, wherein the box member has two tapered, internal, generally dovetail-shaped wedge threads and the pin member has two tapered, external, generally dovetail-shaped wedge threads.

3. The connection of claim 2, wherein the two internal wedge threads on the box member each have a thread start; the two external wedge threads on the pin member each have a thread start;
   the two thread starts of the box member are 180 degrees opposed; and
   the two thread starts of the pin member are 180 degrees opposed.

4. The connection of claim 2, wherein the two wedge threads of each of the pin and box members comprise a first and a second wedge thread and upon make-up a thread seal is formed as the load and stab flanks of the first external wedge thread on the pin member come into contact with the mating load flanks of the first internal wedge thread and the mating stab flanks of the second internal wedge thread on the box member in conjunction with the load and stab flanks of the second external wedge thread on the pin member coming into contact with the mating load flanks of the second internal wedge thread and the mating stab flanks of the first internal wedge thread on the box member.

5. The connection of claim 2, wherein each individual wedge thread on the box member possesses a thread depth, taper, stab flank lead, and load flank lead that are identical to each corresponding wedge thread on the pin member.

6. The connection of claim 2, wherein the internal wedge threads of the box member and external wedge threads of the pin member are tapered so that complementary roots and crests move into engagement during make-up of the connection in conjunction with the flanks moving into engagement upon make-up of the connection and form sealing surfaces that resist the flow of fluids between the threads.

7. The connection of claim 2, wherein the internal wedge threads of the box member and the external wedge threads of the pin member are tapered so that complementary roots and crests maintain controlled clearance upon make-up of the connection and in conjunction with a thread compound form sealing surfaces that resist the flow of fluids between the threads.

8. The connection of claim 2, wherein the roots and crests of the internal wedge threads of the box member and external wedge threads of the pin member have sufficient width to prevent any permanent deformation of the threads when the connection is made up.

9. The connection of claim 2, wherein the roots and crests of the box and pin members are flat and parallel to a longitudinal axis of the connection.

10. The connection of claim 2, wherein the roots of the box and pin members are flat and parallel and the crests are tapered to a longitudinal axis of the connection.

11. The connection of claim 2, wherein contact between the roots and crests of at least one wedge thread on the pin member and complementary roots and crests on the box member occurs prior to contact between the stab and load flanks of at least one wedge thread on the pin member and complementary stab and load flanks on the box member.

12. The connection of claim 2, wherein clearance exists between the roots and crests of at least one wedge thread on the pin member and complementary roots and crests on the box member when contact occurs between the stab and load flanks of at least one wedge thread on the pin member and complementary stab and load flanks on the box member.

13. The connection of claim 1, wherein the box member has two non-tapered, internal, generally dovetail-shaped wedge threads and the pin member has two non-tapered, external, generally dovetail-shaped wedge threads.

14. The connection of claim 1, wherein the box member has at least three internal, generally dovetail-shaped wedge threads and the pin member has an equal number of external, generally dovetail-shaped wedge threads.

15. The connection of claim 14, wherein each individual thread on the box member has a thread start;
   each individual thread on the pin member has a thread start;
   the thread starts of the box member are oriented symmetrically apart from one another; and
   the thread starts of the pin member are oriented symmetrically apart from one another.

16. The connection of claim 14, wherein upon make-up, a thread seal is formed as the load and stab flanks of each external wedge thread on the pin member comes into contact with the mating load flanks of the corresponding internal wedge thread and the mating stab flanks of the adjacent internal wedge thread on the box member.

17. The threaded pipe connection according to claim 1 wherein upon make-up, the load and stab flanks of each external wedge thread on the pin member come into contact with the mating load flanks of the corresponding internal wedge thread and the mating stab flanks of the adjacent internal wedge thread on the box member.

18. A threaded pipe connection comprising:
   a box member having two tapered, internal, generally dovetail-shaped wedge threads, each with stab flanks, load flanks, roots, crests, and a thread start, the internal wedge threads increasing in width in one direction;
   a pin member having two tapered, external, generally dovetail-shaped wedge threads, each with stab flanks, load flanks, roots, crests, and a thread start, the external wedge threads increasing in width in the other direction so that the complementary flanks of the internal and external wedge threads move into engagement upon make-up of the connection; wherein
   the two thread starts of the box member and pin member are 180 degrees opposed;
   each individual wedge thread on the box member possesses a thread depth, taper, stab flank lead, and load flank lead that are identical to each corresponding wedge thread on the pin member;
   the roots and crests of the box member and the pin member have sufficient width to prevent any permanent deformation of the threads when the connection is made up; and
   contact between the roots and crests of at least one wedge thread on the box member and complementary roots and crests on the pin member occurs prior to contact between the stab and load flanks of at least one wedge thread on the box member and complementary stab and load flanks on the pin member.

19. A method of reducing stress during make-up of a threaded pipe connection, the method comprising:
   providing a box member having a plurality of internal, generally dovetail-shaped wedge threads, each with stab flanks, load flanks, roots, and crests, the internal wedge threads increasing in width in one direction and arranged to longitudinally overlap;
   providing a pin member having a plurality of external, generally dovetail-shaped wedge threads, each with stab flanks, load flanks, roots, and crests, the external wedge threads increasing in width in the other direction and arranged to longitudinally overlap so that the complementary flanks of the internal and external wedge threads move into engagement upon make-up of the connection and form a seal as the load and stab flanks of each external wedge thread on the pin member come into contact with mating load and stab flanks of the internal wedge thread of the box member, wherein one of the mating load and stab flanks is of the corresponding internal wedge thread and the other of the mating load and stab flanks is of an adjacent internal wedge thread on the box member; and
   rotationally engaging the pin member and the box member.

20. The method of claim 19, wherein the box member has two tapered, internal, generally dovetail-shaped wedge threads and the pin member has two tapered, external, generally dovetail-shaped wedge threads.

21. The method of claim 20, wherein the two internal wedge threads on the box member each have a thread start; the two external wedge threads on the pin member each have a thread start, further comprising:
   dimensioning the two thread starts of the box member to be 180 degrees opposed; and
   dimensioning the two thread starts of the pin member to be 180 degrees opposed.

22. The method of claim 21, wherein the two wedge threads of each of the pin and box members comprise a first and a second wedge thread, further comprising:
   forming a thread seal upon make-up as the load and stab flanks of the first external wedge thread on the pin member come into contact with the mating load flanks of the first internal wedge thread and the mating stab flanks of the second internal wedge thread on the box member in conjunction with the load and stab flanks of the second external wedge thread on the pin member coming into contact with the mating load flanks of the second internal wedge thread and the mating stab flanks of the first internal wedge thread on the box member.

23. The method of claim 20, further comprising:
   dimensioning each individual wedge thread on the box member to possess a thread depth, taper, stab flank lead, and load flank lead that are identical to each corresponding wedge thread on the pin member.

24. The method of claim 20, further comprising:
   tapering the internal wedge threads of the box member and external wedge threads of the pin member so that complementary roots and crests move into engagement during make-up of the connection in conjunction with the flanks moving into engagement upon make-up of the connection and form sealing surfaces that resist the flow of fluids between the threads.

25. The method of claim 20, further comprising:
   tapering the internal wedge threads of the box member and the external wedge threads of the pin member so that complementary roots and crests maintain controlled clearance upon make-up of the connection and in conjunction with a thread compound form sealing surfaces that resist the flow of fluids between the threads.

26. The method of claim 20, further comprising:
   dimensioning the roots and crests of the internal wedge threads of the box member and external wedge threads of the pin member to have sufficient width to prevent any permanent deformation of the threads when the connection is made up.

27. The method of claim 20, further comprising:
   dimensioning the roots and crests of the box and pin members flat and parallel to a longitudinal axis of the connection.

28. The method of claim 20, further comprising:
   dimensioning the roots of the box and pin members flat and parallel to a longitudinal axis; and
   dimensioning the crests of the box and pin members tapered to the longitudinal axis of the connection.

29. The method of claim 20, wherein contact between the roots and crests of at least one wedge thread on the pin member and complementary roots and crests on the box member occurs prior to contact between the stab and load flanks of at least one wedge thread on the pin member and complementary stab and load flanks on the box member.

30. The method of claim 20, further comprising:
dimensioning the roots and crests of at least one wedge thread on the pin member and complementary roots and crests on the box member so that clearance exists when contact occurs between the stab and load flanks of at least one wedge thread on the pin member and complementary stab and load flanks on the box member.

31. The method of claim 20, wherein the box member has at least three internal, generally dovetail-shaped wedge threads and the pin member has an equal number of external, generally dovetail-shaped wedge threads.

32. The method of claim 31, wherein each individual thread on the box member has a thread start and each individual thread on the pin member has a thread start, the method further comprising:
orienting the thread starts of the box member symmetrically apart from one another; and
orienting the thread starts of the pin member symmetrically apart from one another.

33. The method of claim 31, further comprising:
forming a thread seal as the load and stab flanks of each external wedge thread on the pin member comes into contact with the mating load flanks of the corresponding internal wedge thread and the mating stab flanks of the adjacent wedge thread on the box member.

34. The method of claim 19, wherein the box member has two non-tapered, internal, generally dovetail-shaped wedge threads and the pin member has two non-tapered, external, generally dovetail-shaped wedge threads.

35. The method of claim 19, wherein upon make-up, the load and stab flanks of each external wedge thread on the pin member come into contact with the mating load flanks of the corresponding internal wedge thread and the mating stab flanks of the adjacent internal wedge thread on the box member.

* * * * *